F. TOWNSEND.
Grain Drill.
No. 9,372.
2 Sheets—Sheet 1.
Patented Nov. 2, 1852.
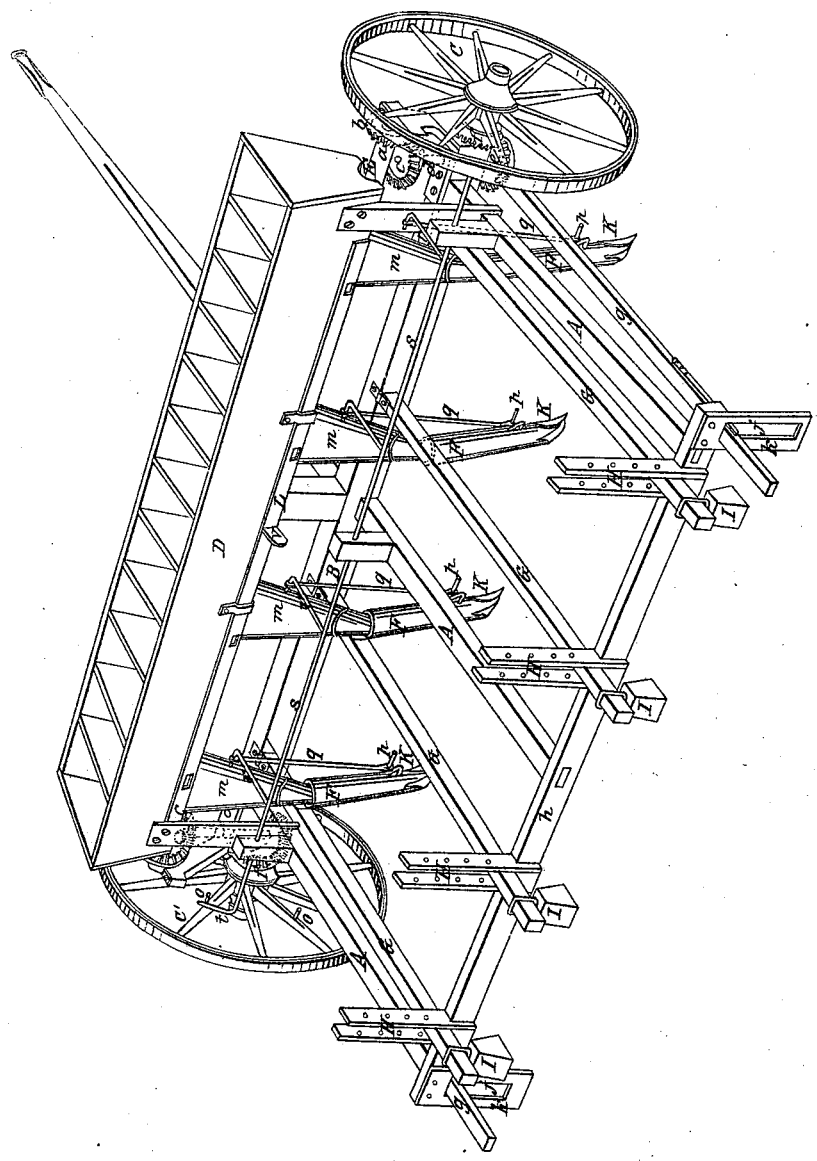

F. TOWNSEND.
Grain Drill.
No. 9,372. Patented Nov. 2, 1852.
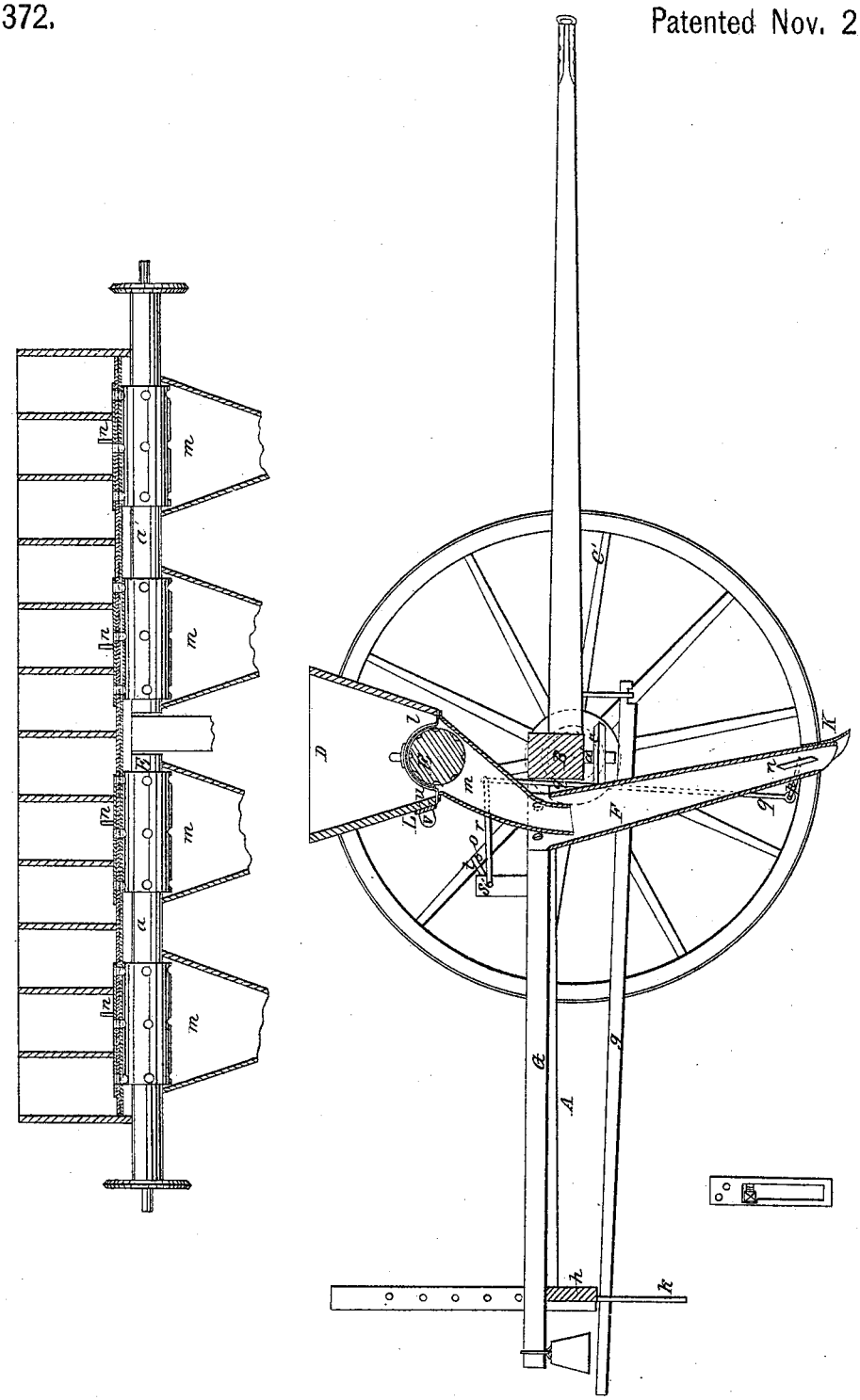

UNITED STATES PATENT OFFICE.

FRANCIS TOWNSEND, OF CAMBRIA, NEW YORK.

IMPROVEMENT IN SEED-PLANTERS.

Specification forming part of Letters Patent No. 9,372, dated November 2, 1852.

*To all whom it may concern:*

Be it known that I, FRANCIS TOWNSEND, of Cambria, in the county of Niagara and State of New York, have invented certain new and useful Improvements in Seed-Drills, of which the following is a full, clear, and exact description, reference being had to the accompanying drawings, in which—

Figure 1 represents a view in perspective of my seed-drill, and Fig. 2 is a vertical longitudinal section of the same.

My invention consists, first, in dividing the distributing-cylinder into two sections, each of which is driven by a separate running-wheel of the drill-carriage, and can be thrown into or out of action independently of the other.

The second part of my invention consists in fitting the tubular shank of each colter with a valve which is opened at proper intervals to discharge simultaneously the seed and manure, which are delivered into the shank from distinct hoppers, and which by this device are prevented falling separately into the furrow; and the third portion of my invention consists in making the concave under side of the hopper-bottom elastic by facing it with india-rubber, leather, or some other suitable material, to prevent such seeds as get between the distributing-cylinder and the bottom from being broken or cut.

In the accompanying drawings, A is the frame of the machine, which is supported on the axle-tree B of a pair of wheels, C C', and is fitted at its front with a tongue, to which the team is hitched. This frame supports a hopper, D, which is divided into a series of separate bins or sections to contain seed and manure. Immediately beneath this hopper is the distributing-cylinder E, which extends from one end of the hopper D to the other, and is divided into two sections, $a\, a'$, each being half as long as the hopper, and each turning independently of the other in suitable boxes secured to the bottom of the seed-hopper. The outer journal of each section projects beyond the end of the seed-hopper, and is fitted with a beveled wheel, $b$, which gears into a similar beveled wheel, $c$, that is fixed upon the upper extremity of a short upright shaft, $d$. The latter is supported in boxes on the axle-tree B. These shafts are also fitted at their lower extremities with beveled wheels $e$, which gear into similar ones, $f$, secured to the hubs of the running-wheels C C'. The lower end of each of the upright shafts is stepped upon a bridge-tree, $g$, which, being hung at its front end from the axle-tree of the frame, extends to the hinder cross-bar, $h$, and is there passed through a slot, $j$, in a hanger, $k$. When the hinder extremity of each bridge-tree is at the lower end of its slot the upright shaft is lowered so far that the teeth of the beveled wheel upon its lower extremity are out of gear with those of the beveled wheel upon the hub of the adjacent running-wheel. When the bridge-tree is raised to strike the upper end of its slot the teeth of these two wheels are in gear, and hence as the running-wheels turn the roller will be correspondingly turned. The bridge-trees are each secured at the upper ends of their respective slots by means of a spring-catch, $i$, which holds the bridge-tree in a notch in the side of the slot.

The bottom of the hopper is closed by a curved plate, $l$, which is fitted loosely to the barrel of the distributing-cylinder, and is perforated with a series of holes, of which there is at least one in each bin, while that portion of the barrel of each section of the distributing-cylinder which turns beneath each of these holes has a series of cup-shaped cavities formed in its surface to receive the articles which pass through the holes in the bottom of the seed-hopper as each cavity is brought in succession beneath its corresponding hole by the movement of the running-wheels. The concave side of the curved bottom plate is faced with leather, india-rubber, or some other elastic substance, to prevent the seeds which project beyond the surface of the cylinder from being bruised as they are conveyed by the turning of the cylinder from the bin to the boot of the share beneath. Each hole in the hopper-bottom is fitted with a sliding register, by means of which the size of the opening, and consequently the quantity of seed discharged, can be regulated at will. A series of flexible boots, $m$, are secured to the seed-hopper immediately beneath the distributing-cylinder. The upper part or mouth of each boot is sufficiently large to receive the articles dropped from several of the bins and to deliver them into the upper extremity of the tubular shank F of a share beneath. The latter are each secured to a lever, G, which is pivoted at its front extremity to the axle-tree of the frame, while its hinder extremity is passed between a pair of standards, H, erected upon the hinder cross-bar of the frame, and projects beyond them, where it is fitted with a weight, I. These weights, acting through the levers, serve to keep the shares K running at their proper distance in the ground; but when any one of the shares strikes an obstacle which would otherwise break the machine the weighted lever rises and allows the share to move backward and pass over the obstruction, after which it immediately restores it to its proper running position. The standards H guide the levers in rising and falling. They are also perforated to admit pins, which being introduced beneath the levers G prevent the latter from falling below a certain limit, and thus regulate the depth of the furrow cut by the shares.

The back side of the hopper D is perforated with a series of holes, $u$, nearly down on a level with the seed-roller. On the outside of the hopper these holes are covered by a sliding bar or register, L, which is perforated in such manner that when the bar is moved in one direction the holes shall be opened to permit the discharge of seed, and when it is moved in the other the holes shall be closed. This sliding bar is provided with a handle, $v$, that can readily be reached by the driver while following the machine, so that he may open or close the holes $u$ at will.

By having the supplementary discharge of seed at the command of the driver of the machine those portions of the ground on which the young plants are particularly liable to be killed by excess of moisture, by frost, or by worms may have an increased quantity of seed sown upon them to compensate such losses, so that there may in the end be a more equable stand of plants on the ground than would be possible under the ordinary systems of drilling or broadcast sowing, which are based upon an equal distribution of seed over the whole field and every seed at the same depth in the soil, whereas my plan is to sow the seed unequally both in quantity and depth. The seed distributed by the main or ordinary distributer is in uniform quantity and deposited at a uniform depth throughout the field, while the seed from the supplementary distributer is only sown in wet places, or such other spots as the plants are likely to be winterkilled in, and it is dropped upon the surface of the ground, so that in case the seed planted deeper should rot this may live, or in case this should suffer from exposure the other, which is not so exposed, may escape uninjured.

The tubular shank of each colter is fitted at its lower extremity with a valve, $n$. The stem $p$ of each of these valves is bent into a crank form, and is connected by a rod, $q$, with an arm, $r$, projected from a horizontal shaft, $s$. The latter is divided into two sections corresponding with the two sections of the distributing-cylinder E, each section being supported in suitable boxes. The outer extremity of each of these sections is fitted with an arm, $t$, which is raised at suitable intervals by means of a series of pins, $o$, which are secured to the spokes of the adjacent running-wheel, the whole arrangement being such that the valves remain closed until one of the pins raises the arm $t$, when the valves are momentarily opened, but are again closed by the weight of the arm $r$ and rod $q$ as soon as the pin has passed the arm $t$. When the valve is closed it will prevent any matters which may have been discharged by the cup-shaped cavities into the tubular share from dropping out, and will retain them until the valve is opened, when they will all drop simultaneously into the furrow beneath. Thus, for example, let corn be placed in one bin, guano in another, and plaster in a third, the three bins being all above the same boot. As then the cylinder is turned by the movement of the running-wheels by which it is driven, the cup-shaped cavities which pass beneath each bin will be filled with the substance contained therein, which will be dropped into the boot beneath. As the corn is smooth it will run down the boot almost instantly, while the guano and the ground plaster will follow more slowly. As the valve is closed the whole three will accumulate upon it and will be dropped all together when the valve is opened, whereas had there been no valve the corn would fall first into the furrow, while the guano and plaster, falling more slowly, would be deposited after the corn, and consequently at a distance from it.

By facing the lower side of the curved bottom of the hopper with some elastic substance the seed is not broken or bruised, which is generally the case with seed-drills as usually constructed. Hence a considerable saving of seed is effected, which amounts to from ten to fifteen per cent.

The division of the distributing-cylinder into two independent sections permits the user to sow with one or both at will, and thus to accommodate his machine to the width of the strip of ground to be sown. It also facilitates the turning of the machine, especially in those seed-drills in which the width of the machine is great. It is of no importance whether the supplementary discharger be constructed as herein specified or otherwise, provided it be capable of performing properly the function assigned to it.

I claim—

In combination with the regular and positive discharge of seed by means of the ordinary seed-distributer of seed-drills, the supplemental or occasional discharge of seed by a supplemental seed-distributer put in and out of action at the discretion of the operator of the machine, substantially as herein set forth.

In testimony whereof I have hereunto subscribed my name.

FRANCIS TOWNSEND.

Witnesses:
EDWARD S. RENWICK,
P. H. WATSON.